US012645735B2

(12) United States Patent
Mysore Devaraj et al.

(10) Patent No.: US 12,645,735 B2
(45) Date of Patent: Jun. 2, 2026

(54) TEXT TO SCREEN VIDEO RECORDER

(71) Applicant: INTERNATIONAL BUSINESS MACHINES CORPORATION, Armonk, NY (US)

(72) Inventors: Dilip Mysore Devaraj, Bengaluru (IN); Manoj Reddy Bedadhala, Tadipatri (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/894,182

(22) Filed: Sep. 24, 2024

(65) Prior Publication Data

US 2026/0087072 A1     Mar. 26, 2026

(51) Int. Cl.
*G06F 16/70*       (2019.01)
*G06F 16/732*      (2019.01)
(Continued)

(52) U.S. Cl.
CPC .......... *G06F 16/732* (2019.01); *G06F 16/738* (2019.01); *G06F 16/748* (2019.01)

(58) Field of Classification Search
CPC ..... G06F 16/732; G06F 16/738; G06F 16/748
See application file for complete search history.

(56) References Cited

U.S. PATENT DOCUMENTS 6,028,601 A * 2/2000 Machiraju ............... G06F 40/30
707/999.005
9,858,090 B2 1/2018 Chalmers et al.
(Continued)

FOREIGN PATENT DOCUMENTS

CN       113805977 A     12/2021
KR   20060108970 A  * 10/2006   ........... G06Q 50/205
KR      2104294 B1  *  4/2020   ........... G06F 16/953

OTHER PUBLICATIONS

Article entitled "Having Difficulty Understanding Manuals? Automatically Converting User Manuals into Instructional Videos", by Liu et al., dated Jun. 2024 (Year: 2024).*

(Continued)

*Primary Examiner* — Mahesh H Dwivedi
(74) *Attorney, Agent, or Firm* — Steven M. Bouknight

(57)     ABSTRACT

A computer-implemented method for automatically generating, in real-time, an image notification corresponding to a computer alert. The computer-implemented may include, based on receiving the natural language query: generating, using a generative artificial intelligence (AI) model, a feature file corresponding to a scenario identified by the generative AI model based on the received natural language query, wherein the generated feature file comprises step-by-step instructions and one or more computer elements required for performing the identified scenario; based on the generated feature file, automatically generating, using the generative AI model, computer code corresponding to each of the step-by-step instructions from the generated feature file; executing the generated computer code, wherein executing the generated code further comprises executing navigating and interacting with the one or more computer elements in a sequence according to the step-by-step instructions from the generated feature file; and automatically recording as a video, using a screen recorder, the execution of the generated computer code, and storing the recorded video.

17 Claims, 5 Drawing Sheets

(51) Int. Cl.
    *G06F 16/738*        (2019.01)
    *G06F 16/74*          (2019.01)

(56)                    References Cited

U.S. PATENT DOCUMENTS

| | | | |
|---|---|---|---|
| 10,324,828 B2 | 6/2019 | Shtuchkin et al. | |
| 10,642,608 B2 | 5/2020 | Grant et al. | |
| 2010/0191619 A1* | 7/2010 | Dicker | G06Q 30/0603 |
| | | | 705/26.1 |
| 2016/0360298 A1* | 12/2016 | Chalmers | G06F 9/45512 |
| 2019/0213116 A1 | 7/2019 | Kulkarni et al. | |
| 2020/0110835 A1* | 4/2020 | Zhao | G06N 5/022 |
| 2020/0293825 A1* | 9/2020 | Ji | G06N 20/20 |
| 2022/0276882 A1 | 9/2022 | Bradfield | |
| 2023/0393963 A1 | 12/2023 | Mangat et al. | |
| 2025/0086395 A1* | 3/2025 | Srinivasan | G06F 40/30 |

OTHER PUBLICATIONS

Machine Translation of KR 102104294B1, by Yu, Published on Apr. 24, 2020 (Year: 2020).*
Article entitled "Automatic Instructional Video Creation from a Markdown-Formatted Tutorial", by Chi et al., dated Oct. 14, 2021 (Year: 2021).*
Machine Translation of KR20060108970A issued to Jeon, published on Oct. 19, 2006 (Year: 2006).*

\* cited by examiner

100

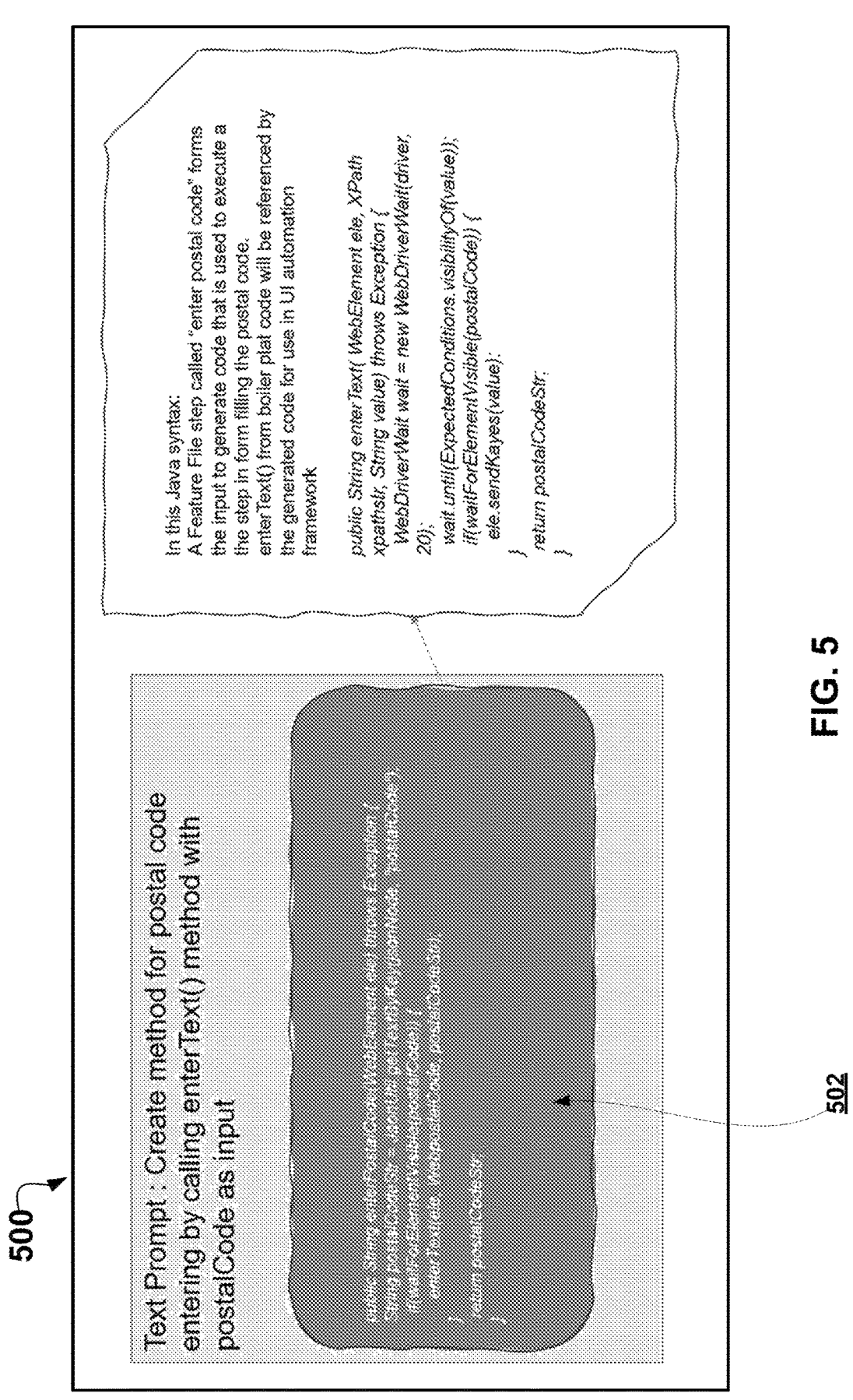

In this Java syntax:
A Feature File step called "enter postal code" forms the input to generate code that is used to execute a the step in form filling the postal code.
enterText() from boiler plat code will be referenced by the generated code for use in UI automation framework

```
public String enterText( WebElement ele, XPath
xpathstr, String value) throws Exception {
    WebDriverWait wait = new WebDriverWait(driver,
20);
    wait.until(ExpectedConditions.visibilityOf(value));
    if(waitForElementVisible(postalCode)) {
        ele.sendKeyes(value);
    }
    return postalCodeStr;
}
```

Text Prompt : Create method for postal code entering by calling enterText() method with postalCode as input

TEXT TO SCREEN VIDEO RECORDER

BACKGROUND

The present invention relates generally to the field of computing, and more specifically, to automatically generating a screen recorded video based on natural language text.

Generally, a screen recorder may include an application or program that captures information displayed on a user's computer screen. Specifically, the screen recording application or program may allow a user to record information on a user's screen such as audio, video, and the user's movements/interactions on the screen. Once recorded, the screen recording software may compile visuals from the recording into a video file which the user may then be able to save and share. Screen recording can be a useful tool for a number of reasons including creating a tutorial, recording a game session, or capturing a webinar. For example, screen recordings can more effectively explain information technology (IT) issues as well as provide technical solutions and assistance by creating how-to guides. Currently, there are a number of screen recording applications and programs available that may allow user to perform a screen recording.

SUMMARY

A computer-implemented method for automatically generating a computer screen recorded video based on a natural language query is provided. The computer-implemented may include, based on receiving the natural language query: generating, using a generative artificial intelligence (AI) model, a feature file corresponding to a scenario identified by the generative AI model based on the received natural language query, wherein the generated feature file comprises step-by-step instructions and one or more computer elements required for performing the identified scenario; based on the generated feature file, automatically generating, using the generative AI model, computer code corresponding to each of the step-by-step instructions from the generated feature file; executing the generated computer code, wherein executing the generated code further comprises executing navigating and interacting with the one or more computer elements in a sequence according to the step-by-step instructions from the generated feature file; and automatically recording as a video, using a screen recorder, the execution of the generated computer code, and storing the recorded video.

A computer system for automatically generating a computer screen recorded video based on a natural language query is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing operational steps. The operational steps may include, based on receiving the natural language query: generating, using a generative artificial intelligence (AI) model, a feature file corresponding to a scenario identified by the generative AI model based on the received natural language query, wherein the generated feature file comprises step-by-step instructions and one or more computer elements required for performing the identified scenario; based on the generated feature file, automatically generating, using the generative AI model, computer code corresponding to each of the step-by-step instructions from the generated feature file; executing the generated computer code, wherein executing the generated code further comprises executing navigating and interacting with the one or more computer elements in a sequence according to the step-by-step instructions from the generated feature file; and automatically recording as a video, using a screen recorder, the execution of the generated computer code, and storing the recorded video.

A computer program product for automatically generating a computer screen recorded video based on a natural language query is provided. The computer program product may include one or more computer-readable storage devices and program instructions stored on at least one of the one or more tangible storage devices, the program instructions executable by a processor. The computer program product may include program instructions to, based on receiving the natural language query: generating, using a generative artificial intelligence (AI) model, a feature file corresponding to a scenario identified by the generative AI model based on the received natural language query, wherein the generated feature file comprises step-by-step instructions and one or more computer elements required for performing the identified scenario; based on the generated feature file, automatically generating, using the generative AI model, computer code corresponding to each of the step-by-step instructions from the generated feature file; executing the generated computer code, wherein executing the generated code further comprises executing navigating and interacting with the one or more computer elements in a sequence according to the step-by-step instructions from the generated feature file; and automatically recording as a video, using a screen recorder, the execution of the generated computer code, and storing the recorded video.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 5 illustrates an example code generation process based on a natural language query and scenario using Java syntax according to one embodiment.

DETAILED DESCRIPTION

Figure 1:
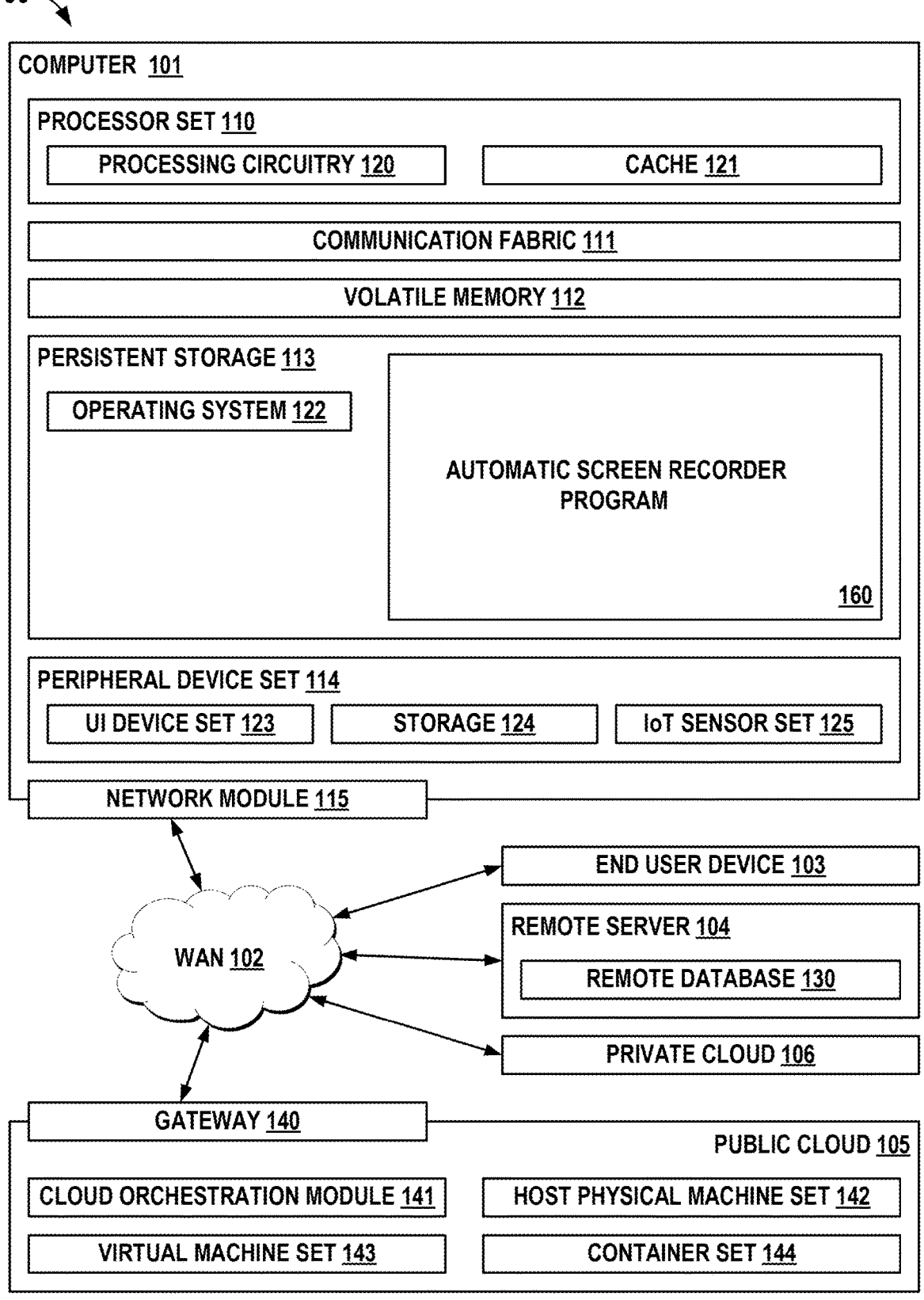
FIG. 1 illustrates an exemplary computing environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate generally to the field of computing, and more particularly, to automatically generating a screen recorded video based on received natural language text. Specifically, the present invention may improve the technical field associated with screen recorded videos by providing a technical solution that not only automates the generation of a screen recorded video in response to receiving a natural language, but also automatically provides precise step-by-step instructions and any necessary computer elements for completing a particular task, and thereby removing any manual effort from the screen recording process and minimizing any dependency on a individual's knowledge/skills in a particular domain that may be required for identifying and selecting correct content for screen recording.

As previously described, screen recording software may allow a user to record information on a user's screen including recording audio, video, and a user's movements/interactions on a computer screen. The screen recording software may also allow the user to save the recording to a computer as well as share the recording. As previously indicated, there are a number of screen recording applications and programs available to allow a user to record a screen. However, current screen recording applications and programs fail to provide a technical solution that automatically generates a screen recording based on received natural language text. Specifically, for example, typical current screen recording applications and programs require a manual effort where users are required to initiate the screen recording process by often performing an action such as pressing a screen record button. Thereafter, such screen recording applications and programs may then capture the audio and video. Furthermore, in screen recording scenarios such as how-to guides, a person often needs to perform the movements/interactions on screen to provide necessary directions for other users. Thus, overall, the current screen recording process requires manual generation with significant manual effort and time consumption. As such, it may be advantageous, among other things, to provide a method, computer system, and computer program product for automatically generating a screen recording based on received natural language text. In turn, and as previously described, the present invention may improve the technical field associated with screen recordings by providing a technical solution that not only automates the generation of a screen recorded video in response to receiving a natural language, but also automatically provides precise step-by-step instructions and any necessary computer elements for completing a particular task, and thereby removing any manual effort from the screen recording process and minimizing any dependency on a individual's knowledge/skills in a particular domain that may be required for identifying and selecting correct content for screen recording.

Specifically, the method, computer system, and computer program product may, based on receiving a natural language query, generate, using a generative artificial intelligence (AI) model, a feature file corresponding to a scenario identified by the generative artificial intelligence (AI) model in the received natural language query, whereby the feature file comprises step-by-step instructions generated by the generative AI model, and whereby the step-by-step instructions further comprises one or more computer elements required for performing the identified scenario. Then, the method, computer system, and computer program product may, based on the generated feature file, automatically generate, using the generative AI model, code corresponding to each of the step-by-step instructions from the generated feature file. Next, the method, computer system, and computer program product may execute the generated code, whereby executing the generated code further comprises invoking a web driver for interacting with the one or more computer elements according to the step-by-step instructions from the generated feature file. Furthermore, the method, computer system, and computer program product may automatically record as a video, using a screen recorder, the interaction with the one or more computer elements based on the generated and executed code, whereby the screen recorded interaction video is stored and shared with a user.

The present invention may be a computer system, a method, and/or a computer program product at any possible technical detail level of integration. The computer program product may include a computer readable storage medium (or media) having computer readable program instructions thereon for causing a processor to carry out aspects of the present invention.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer program product and computer readable storage medium, as those terms are used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to automatically generate a screen recorded video based on natural language text.

Referring to FIG. 1, an exemplary computing environment 100 is depicted, according to at least one embodiment. Computing environment 100 contains an example of an environment for the execution of at least some of the computer code involved in performing the inventive methods, such as an automatic screen recorder program 160. In addition to block 160, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 160, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer (such as a wearable headset), mainframe computer, quantum computer or any other form of computer or mobile device now known or to be developed in the future that is capable of running a program, accessing a network and/or querying a database, such as database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 160 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage 113 allows writing of data, deletion of data and re-writing of data. Some familiar forms of persistent storage 113 include magnetic disks and solid state storage devices. Operating system 122 may take several forms, such as various known proprietary operating systems or open source Portable Operating System Interface type operating systems that employ a kernel. The code included in block 160 typically includes at least some of the computer code involved in performing the inventive methods.

Peripheral device set 114 includes the set of peripheral devices of computer 101. Data communication connections between the peripheral devices 114 and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles, headsets, and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector and/or accelerometer.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments the private cloud 106 may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Furthermore, notwithstanding depiction in computer 101, the automatic screen recorder program 160 may be stored in and/or executed by, individually or in any combination, with end user device 103, remote server 104, public cloud 105, and private cloud 106. The automatic screen recorder program is explained in further detail below with respect to FIGS. 2-4.

According to the present embodiment, and as previously described, the automatic screen recorder program 160 may be a program/code capable of automatically generating a screen recorded video based on a natural language query. Specifically, the automatic screen recorder program 160 may, based on receiving the natural language query, generate, using a generative artificial intelligence (AI) model, a feature file corresponding to a scenario identified by the generative artificial intelligence (AI) model from the received natural language query, whereby the feature file comprises step-by-step instructions generated by the generative AI model, and whereby the step-by-step instructions further comprise one or more computer elements associated with a computer application determined to be required for performing the identified scenario. The automatic screen recorder program 160 may further, based on the generated feature file, automatically generate, using the generative AI model, code corresponding to each of the step-by-step instructions from the generated feature file. Next, the automatic screen recorder program 160 may execute the generated code, whereby executing the generated code further comprises invoking a web driver for interacting with the one or more computer elements according to the step-by-step instructions from the generated feature file. Then, the automatic screen recorder program 160 may automatically record as a video, using a screen recorder, the interaction with the one or more computer elements based on the generated and executed code, whereby the screen recorded interaction video is stored and shared with a user.

Figure 2:
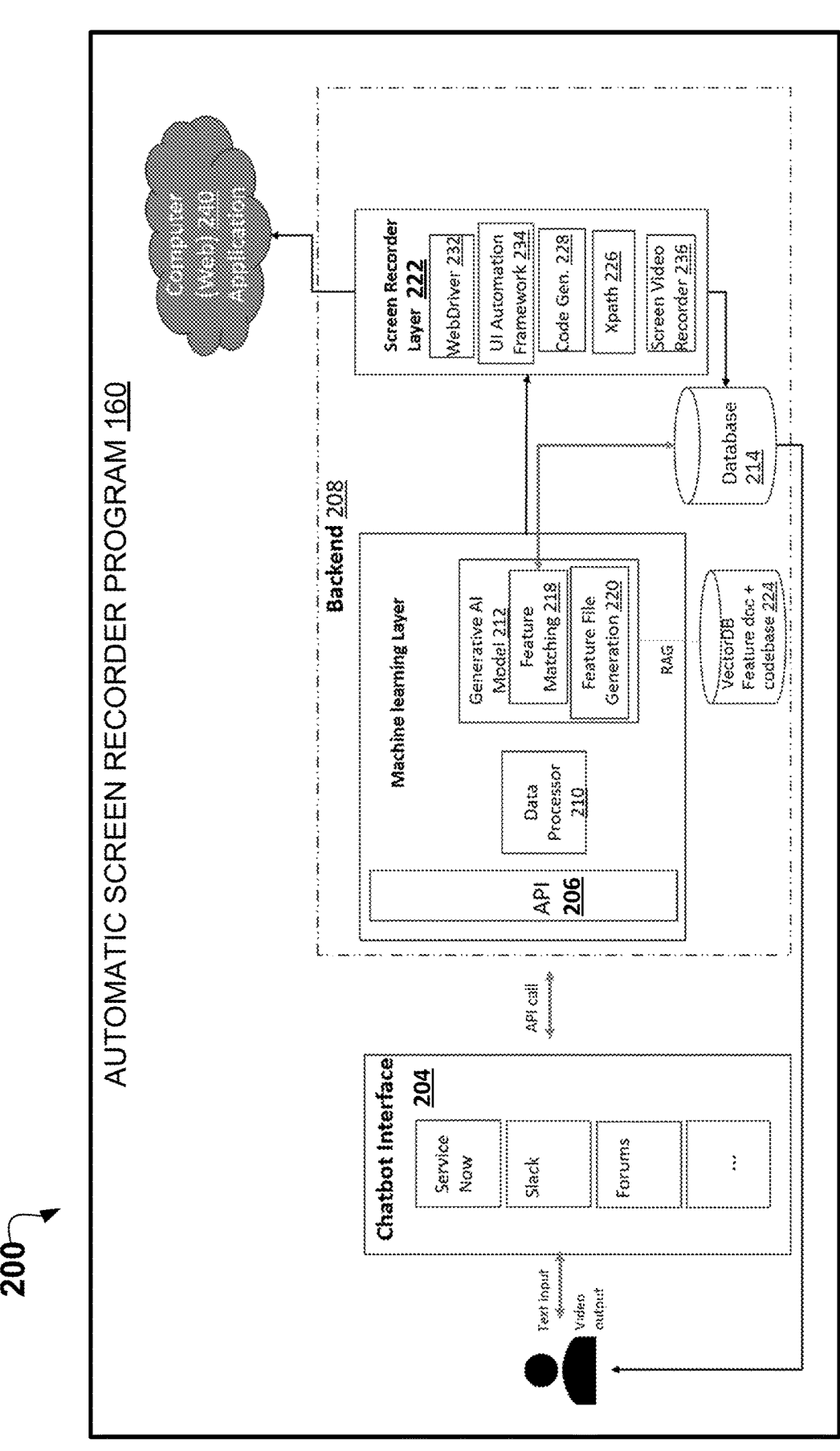
FIG. 2 is a block diagram of the system architecture of a program for automatically generating a screen recorded video based on a natural language query according to one embodiment.

Referring now to FIG. 2, a block diagram 200 of the system architecture of a program for automatically generating a screen recorded video based on a natural language query is provided. As depicted in FIG. 2 and previously described with respect to FIG. 1, the program may include the automatic screen recorder program 160. According to one embodiment, the automatic screen recorder program 160 may include or be integrated with a chat interface 204. More specifically, the automatic screen recorder program 160 may use the chat interface 204 to receive a natural language query from a user 202. The chat interface 204 may, for example, include or be integrated with one or more chat applications such as ServiceNow® (ServiceNow and all ServiceNow-based trademarks and logos are trademarks or registered trademarks of ServiceNow, Inc. and/or its affiliates), Slack® (Slack and all Slack-based trademarks and logos are trademarks or registered trademarks of Salesforce, Inc. and/or its affiliates), and/or other chatbots and forums. An example natural language query may include natural language text such as: "As a Support Administrator, I want to know how to change the order type and amount for a given order." Accordingly, in response to receiving the natural language query, the automatic screen recorder program 160 may process the received natural language query by, for example, making an application programming interface (API) call to an API 206 associated with a backend 208 of the automatic screen recorder program 160. Generally, an API call or API request may include a message sent and asking an API to provide a service or information based on a query whereby, based on the present invention, the provided service or information may in turn include a screen recorded video with respect to the present invention.

In turn, the automatic screen recorder program 160 may use a data processor 210 to process the natural language query. Specifically, the automatic screen recorder program 160 may include natural language processing tools and algorithms to validate the natural language query for correctness, understand text/language within the natural language query, and automatically generate a text prompt. For example, according to one embodiment, text prompts may refer to specific keywords or sentences that may be generated as input for a generative artificial intelligence (AI) model 212. The generative AI model (or GenAI model) 212 may include various foundation models, machine learning algorithms, and/or large language models (LLMs), which may be used to generate coherent and contextually relevant outputs in response to the natural language query. Accordingly, and with respect to the natural language query previously discussed, an example text prompt generated for the generative AI model 212 may include: "Find a matching scenario for this phrase: 'As a Support Administrator, I want to know how to change the order type and amount for a given order.'" Based on the text prompt, the automatic screen recorder program 160 may use the generative AI model 212 to identify a scenario based on the understanding of the natural language query. Therefore, using the foundation models, machine learning algorithms, and/or large language models (LLMs), the generative AI model 212 may identify a scenario based on the natural language text, such as identifying that a user who is admin support wants information on how to change an order type and amount for an order.

According to one embodiment, based on the text prompt and the identified scenario, the automatic screen recorder program 160 may further determine whether a screen recorded video may already exists for the received natural language query. Specifically, the automatic screen recorder program 160 may have already created a screen recorded video (according to a process to be described) based on a previously received natural language query and a previously identified scenario that may match the identified scenario from the currently received natural language query described above. More specifically, and referring again to FIG. 2, database 214 may store screen recorded videos previously created based on previously received natural language queries. Thus, according to one embodiment, and by performing a search on database 214, the automatic screen recorder program 160 may determine whether a screen recorded video already exists for the identified scenario associated with the currently received natural language query based on previously received natural language queries.

For example, the automatic screen recorder program 160 may perform a search on the database 214 by using and converting terms from the text prompt and natural language query to a vector. Thereafter, the automatic screen recorder program 160 may use the vectors as search material/terms for identifying matching vectors associated with feature documentation and/or other sources stored on database 214, as well as other sources which may be stored on other knowledgebases 224 (via retrieval-augmented generation). Specifically, the automatic screen recorder program 160 may associate terms and/or vectors with the feature documentation and/or other forms of sources (audio, video, etc.), and the feature documentation and other sources may include searchable terms themselves. Furthermore, the automatic screen recorder program 160 may use retrieval-augmented generation (RAG) to provide further resources and feature documentation outside of the feature documentation and sources stored on database 214. Generally, RAG is a type of information retrieval process that may combine a generative AI model and/or LLM with external knowledgebases (such as knowledgebase 224) to thereby optimize output from the generative AI model and/or LLM by allowing the generative AI model to reference different authoritative knowledgebases outside of its training data sources before generating a response. Generally, generative AI models that may include LLMs may be trained on vast volumes of data and documentation using billions of parameters to generate original output for tasks such as answering questions, translating languages (such as to code), and completing sentences. Thus, generally, RAG extends the already powerful capabilities of generative AI models (and LLMs) by combining the model with other domains and knowledgebases without a need to retrain the model, having the effect of providing the latest research, statistics, and/or news to the generative AI model. Thus, accordingly, each of database 214 and a knowledgebase 224 may store database records including feature documentation such as manuals, specifications, and detailed operations of different computer programs, applications, operating and other software. Furthermore, according to one embodiment, database 214 and/or knowledgebase 224 may further include a vector database (vector store or vector search engine) that may store vectors along with other data items whereby a search can be performed on the database with a query vector to retrieve closest matching database records. Database 214 and knowledgebase 224 may also each include a codebase database that may store a collection of code used to build and/or implement particular computer software systems, programs, applications, and/or software components.

Accordingly, the automatic screen recorder program 160 may use the generated search terms/vectors to identify feature documentation and/or other sources in database 214 and knowledgebase 224. Based on the natural language query, text prompt, and search vectors/terms, the automatic screen recorder program 160 may identify specific feature documentation and/or sources that may match the identified scenario based on the received natural language query, such as by identifying documents that include information and/or specifications on order management and admin support. Therefore, the automatic screen recorder program 160 may identify and match the text prompt and search terms to the specific feature documentation and may use the generative AI model 212 for further processing and determination of whether the specific scenario that a user is requesting matches one or more previously screen recorded videos associated with the feature documentation. More specifically, the automatic screen recorder program 160 may use the generative AI model 212 to further determine in database 214 whether a video has already been generated for the specific scenario. For example, database 214 may store previously screen recorded videos that were previously generated, and database 214 may include a mapping between the previously generated videos (and/or links to the previously generated videos) to scenario descriptions that may be associated with feature documentation. In other words, each feature documentation may be linked with different scenarios (and/or scenario descriptions), and in turn each scenario description may be linked with different screen recorded videos that were previously generated. Accordingly, in response to the automatic screen recorder program 160 determining, via the generative AI model 212, that a stored video (i.e. previously screen recorded video) and/or scenario description associated with the feature documentation matches the identified scenario in the received natural language query, the automatic screen recorder program 160 may retrieve and forward/send the screen recorded video, and/or a video link, to the user 202 (for instance, via the chatbot interface 204).

On the contrary, and according to one embodiment, in response to the automatic screen recorder program 160 determining that a video does not exist or has not been generated for the particular identified scenario, the automatic screen recorder program 160 may take further steps which include automatically generating a screen recorded video for the identified scenario. Specifically, and as depicted in FIG. 2 by feature matching 218, the automatic screen recorder program 160 may again use the natural language query, prompt text, and search vectors/terms to identify features and feature documentation that may match the identified scenario by searching the database 214 (and other knowledgebases 224, via RAG) for the documentation and sources matching the features and the identified scenario. Based on identifying the feature documentation and/or sources matching the search vectors/terms and the identified scenario, the automatic screen recorder program 160 may use the generative AI model 212 to generate a feature file which may translate the feature documentation and/or matching sources into step-by-step instructions for performing a task associated with the identified scenario. Thus, based on the previously described example, the automatic screen recorder program 160 may again identify specific feature documentation that includes information and instructions on how to change the order type and amount for a given order for admin support. Accordingly, the automatic screen recorder program 160 may send the matching search vectors/terms and identified feature documentation to the generative AI model 212 for further processing.

In turn, based on the identified scenario and the feature documentation (i.e. which includes information and instructions on changing an order type and amount), the automatic screen recorder program 160 may use the generative AI model 212 to automatically generate a feature file 220, whereby the feature file 220 includes step-by-step instructions for executing the task from the identified scenario. Specifically, the generative AI model 212 may use the information and instructions from the matching feature documentation to generate the step-by-step instructions. In generating the feature file 220, the generative AI model 212 may add any required prerequisite values to the feature file 220, whereby the prerequisite values may include values requiring entry into a user interface (UI), which in the previously provided example of the received natural language query includes adding an order type field and amount value field to the feature file.

Figure 4:
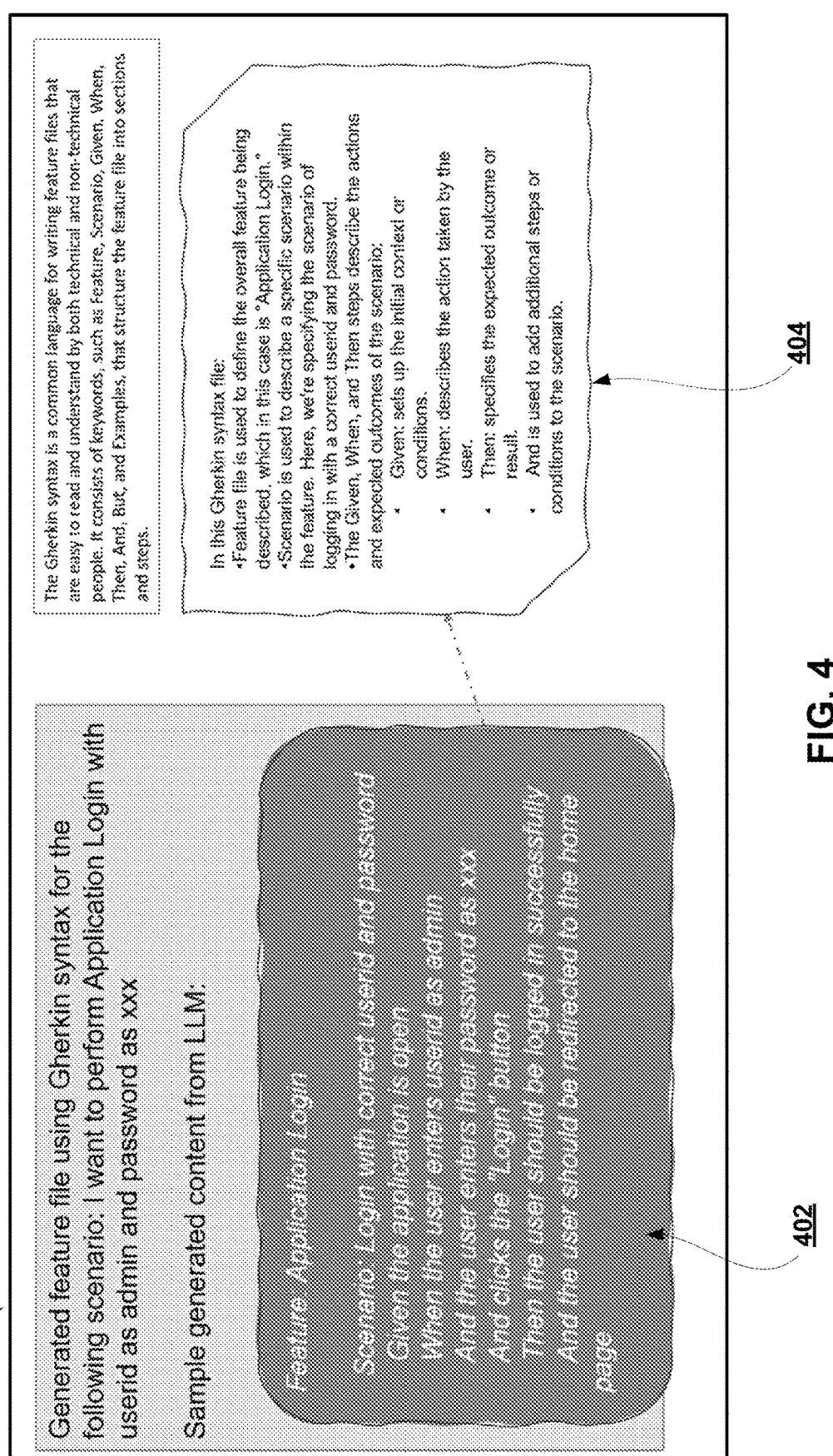
FIG. 4 illustrates an example feature file generated using Gherkin syntax according to one embodiment.

For example, FIG. 4 includes an example feature file generation process 400 based on a different scenario, whereby the feature file 402 is generated using Gherkin syntax. As indicated at 402, Gherkin syntax is a common language for writing feature files that are easy to read and understand. In FIG. 4, the generated feature file 402 uses Gherkin syntax for generating the feature file based on the following entered scenario: "I want to perform Application Login with userid as admin and password as xxx." Accordingly, and as depicted at 402, the automatic screen recorder program 160 may use the generative AI model 212 to generate the feature file 402 using Gherkin syntax and based on a process further described in 404. As further indicated in example feature file 402, for the scenario "Application Login", the automatic screen recorder program 160 may include in the feature file 402 step-by-step instructions for an application log-in which may further include prerequisite values such as "admin" and "xxx" that are required for entry into the UI fields "userid" and "password", respectively. Again, in the previously presented example (i.e. the example including the received natural language query: "As a Support Administrator, I want to know how to change the order type and amount for a given order"), the prerequisite values may include values requiring entry into the UI fields "order type" and "amount."

Next, referring back to FIG. 2, based on the generated feature file 218, the automatic screen recorder program 160 may generate code for executing the step-by-step instructions. Specifically, while the feature file 220 may include the step-by-step instructions for performing the task from the identified scenario in the natural language query, the feature file 220 does not necessarily include executable code instructions. Accordingly, the automatic screen recorder program 160 may use the generative AI model 212 as well as the screen record layer 222 to generate executable code for performing the step-by-step instructions in the feature file 220. Specifically, and according to one embodiment, the automatic screen recorder program 160 may generate executable code based on the feature file 220 by referencing existing code which may be stored on database 214. As previously described, database 214 and knowledgebase 224 may each include a codebase database that may store a collection of code used to build and/or implement particular computer software systems, programs, applications, and/or software components. Database 214 may, for example, store and provide boilerplate code associated with a particular computer system and/or computer software. Additionally, knowledgebase 224 may provide the generative AI model 212 with additional codebase via the RAG mechanism to ensure high quality code generation output. Accordingly, in generating the executable code for the feature file 220, the automatic screen recorder program 160 may use the generative AI model 212 to receive as input a step from the step-by-step instructions and generate code that is used to execute that step based on code from database 214 and knowledgebase 224.

Accordingly, using the generative AI model 212, the automatic screen recorder program 160 may identify that the identified scenario, which includes changing the order type and amount for a given order, is to be executed on a computer application 240, such as a web application/page, via a web browser. Accordingly, using the generative AI model 212, the automatic screen recorder program 160 may identify a web browser application and a Uniform Resource Locator (URL), which may include an address of the web page that is needed to execute the identified scenario. According to one embodiment, the automatic screen recorder program 160 may be configured with one or more default computer applications and/or systems, such as a default web browser, for executing certain computer tasks (such as tasks specifically to be performed on a web browser). According to one embodiment, the one or more default applications/systems may be configurable (i.e. specified/changed) using, for example, a user interface. Referring back to the previous example, the automatic screen recorder program 160 may crawl the URL (for example, using web crawlers) and identify web elements needed for executing the identified scenario. Specifically, and as depicted at 226 in FIG. 2, the automatic screen recorder program 160 may use Xpath 226 to identify a location of specific computer/web elements on a web page, whereby the specific web elements may be associated with a feature from the feature file 220 that is required to execute an instruction from the step-by-step instructions. Generally, XPath (which stands for XML Path Language) may use path expressions to select nodes or node-sets in an XML document, whereby the node is selected by following a path or step such as a step from the step-by-step instructions in the feature file 220. Accordingly, the automatic screen recorder program 160 may use the generative AI model 212 to map the features (or computer/web elements) from the steps with the Xpath 226 of the web element. In turn, based on the Xpath 226, any further programming arguments, datatypes, and predetermined and/or user provided values, the automatic screen recorder program 160 may use the generative AI model 212, as well as the database 214 and knowledgebase 224 as previously described, to generate executable code for the step-by-step instructions as depicted at code generation 228.

FIG. 5 further provides an example code generation process 500 based on a different natural language query and scenario, whereby the example code 502 is generated using Java syntax. As depicted in the example provided in FIG. 5, a feature file may include a step called "enter postal code", and the automatic screen recorder program 160 may receive the input via a text prompt to generate the code that is used to execute the step in the form of filling in the postal code. Accordingly, for enterText( ), the automatic screen recorder program 160 may use the generative AI model 212 to, for example, reference boilerplate code from database 214 for generating the code.

Referring back to FIG. 2, the automatic screen recorder program 160 may then use a combination of a web driver 232 and/or user interface (UI) framework 234, as well as a screen video recorder 236, to execute the generated code 228 while simultaneously recording the executed code for automatically generating the screen recorded video for the identified scenario. For example, and based on the identified scenario associated with the received natural language query, the automatic screen recorder program 160 may invoke/use the web driver 232 for launching the computer/web application, such as a web browser, as well as for navigating through the web application based on the step-by-step instructions and corresponding generated code. Generally, a web driver 232, in web automation, is a programming interface and protocol that allows interaction with a web application programmatically, providing a way to control the web browser through code and enabling tasks such as navigating through web pages, interacting with web elements, submitting data, and extracting data. Furthermore, according to one embodiment, the automatic screen recorder program 160 may use a UI automation framework 234 for automatically and programmatically executing a feature flow based on the generated code 228 that corresponds to the features and steps identified in the feature file 220.

In turn, the automatic screen recorder program 160 may use the web driver 232 and/or user interface (UI) framework 234 to organize the generated feature file, the generated code, and other dependencies (such as code libraries, constants) in order to automatically execute the generated code by performing a real-time simulation of the identified scenario which may include performing computer screen interactions such as opening the web browser, logging into the web page required for performing the identified scenario, and navigating through the web page including interacting with the web elements (such as interacting with a UI order field and UI amount field) according to each of the step-by-step instructions from the feature file. Furthermore, the automatic screen recorder program 160 may use the screen video recorder 236 to automatically record the simulation and thereby create a screen recorded video for the identified scenario associated with the received natural language query. Accordingly, based on the executed code 228 and screen video recorder 236, the generated screen recorded video may show the step-by-step instructions for changing the order type and amount for a given order. The automatic screen recorder program 160 may subsequently store the screen recorded video on database 214, whereby the storing may further include associating the natural language query, corresponding feature documentation, the text prompt, and the search vectors/terms with the screen recorded video. Subsequently, the automatic screen recorder program 160 may automatically share the generated and stored screen recorded video with the user 202. According to one embodiment, the automatic screen recorder program 160 may share a video link to the generated and stored screen recorded video.

Figure 3:
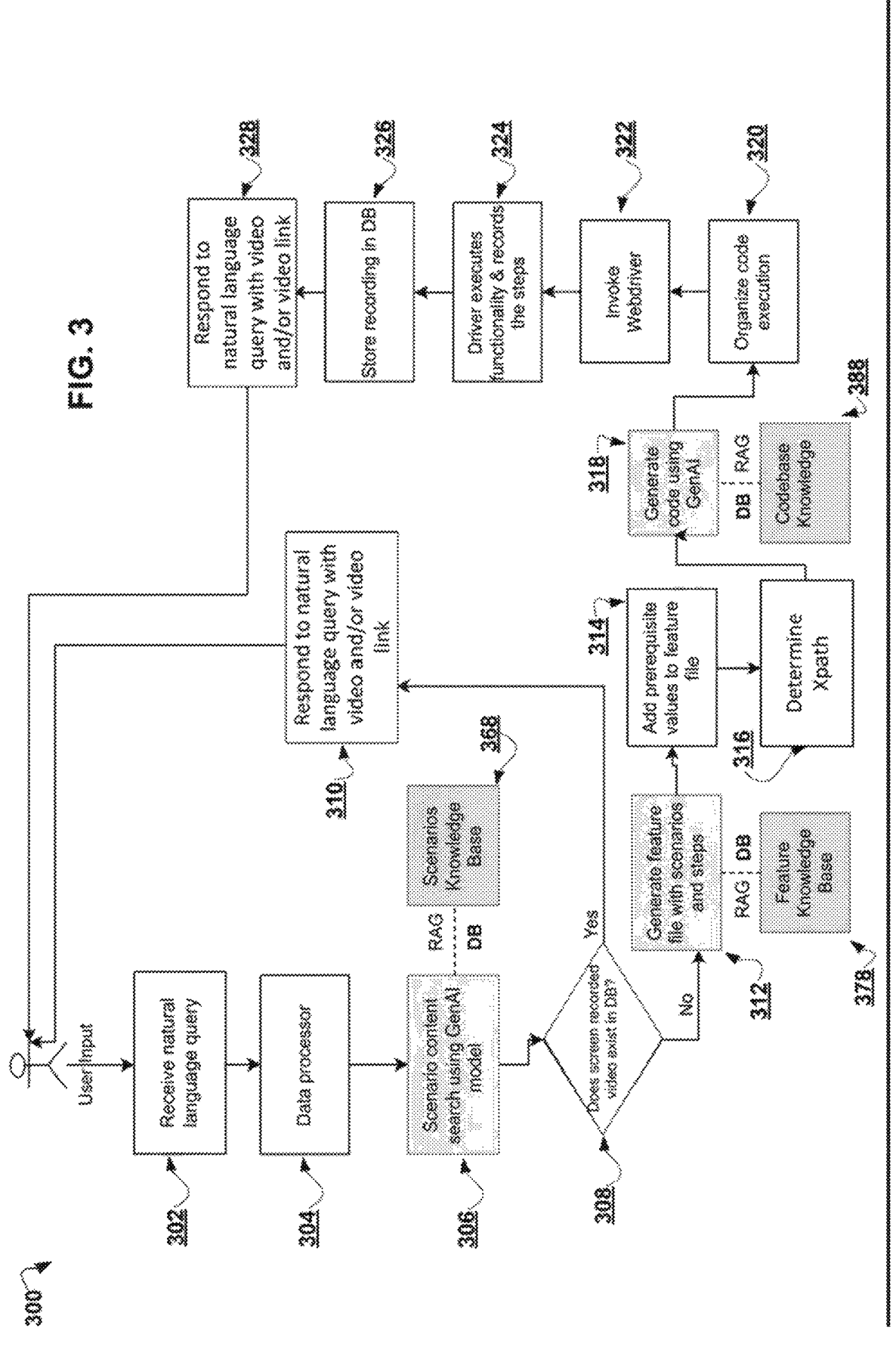
FIG. 3 is an operational flowchart for a program, for automatically generating a screen recorded video based on a natural language query according to one embodiment.

Referring now to FIG. 3, an operational flowchart 300 for a program, such as the automatic screen recorder program 160, for automatically generating a screen recorded video based on a natural language query is provided. The operational flowchart 300 will be described with references to FIG. 2 discussed above.

As depicted in FIG. 3 at 302, the automatic screen recorder program 160 may receive input such as a natural language query from a user. As previously described with respect to FIG. 2, the automatic screen recorder program 160 may include or be integrated with a chat interface 204 (FIG. 2) to receive a natural language query from a user 202. Also, as previously described, an example natural language query may include natural language text such as: "As a Support Administrator, I want to know how to change the order type and amount for a given order."

Accordingly, and as depicted at 304, in response to receiving the natural language query, the automatic screen recorder program 160 may process the received natural language query. Specifically, and as previously described in FIG. 2, the automatic screen recorder program 160 may make an application programming interface (API) call to an API 206 (FIG. 2) associated with a backend 208 (FIG. 2) of the automatic screen recorder program 160. In turn, the automatic screen recorder program 160 may use a data processor 210 (FIG. 2) to process the natural language query. Specifically, the automatic screen recorder program 160 may include and use natural language processing tools and algorithms to validate the natural language query for correctness, understand text/language within the natural language query, and automatically generate a text prompt. For example, according to one embodiment, text prompts may refer to specific keywords or sentences that may be generated as input to a generative artificial intelligence (AI) model 212 (FIG. 2). The generative AI model 212 (FIG. 2) may include various foundation models, machine learning algorithms, and/or large language models (LLMs), which may be used to generate coherent and contextually relevant outputs in response to the natural language query (in this case, an output that includes a screen recorded video). Accordingly, and with respect to the natural language query previously discussed, an example text prompt generated for the generative AI model 212 (FIG. 2) may include: "Find a matching scenario for this phrase: 'As a Support Administrator, I want to know how to change the order type and amount for a given order.'"

Based on the text prompt, and as depicted at 306 in FIG. 3, the automatic screen recorder program 160 may use the generative AI model 212 (FIG. 2) to identify a scenario based on an understanding of the natural language query and, as depicted at 308, may further determine whether a screen recorded video may already exists in database 214 (FIG. 2). For example, the generative AI model 212 (FIG. 2) may identify a scenario, such as identifying that a user who is admin support wants information on how to change an order type and amount for an order. As depicted at 368, the generative AI model 212 (FIG. 2) may further determined whether the identified scenario may match scenario description on database 214 (FIG. 2) and/or a knowledgebase 224 (FIG. 2). In turn, and as previously stated with respect to 308, the automatic screen recorder program 160 may determine whether a screen recorded video may already exists in database 214 (FIG. 2) based on the identified scenario. As previously described with respect to FIG. 2 at 214, the automatic screen recorder program 160 may have already created a screen recorded video based on a previously received natural language query having a previously identified scenario that may match the identified scenario from the received natural language query described above. More specifically, and referring again to FIG. 2, database 214 (FIG. 2) may store screen recorded videos previously created based on previously received natural language queries. Thus, at 308, the automatic screen recorder program 160 may determine whether a screen recorded video already exists for the identified scenario associated with the received natural language query based on previously received natural language queries by performing a search on database 214 (FIG. 2).

For example, and as previously described with respect to FIG. 2, database 214 may include stored screen recorded videos that were previously generated as well as include a mapping between the previously generated videos (and/or links to the previously generated videos) to scenario descriptions that may be associated with feature documentation. In other words, each feature documentation may be linked with different scenarios (and/or scenario descriptions), and in turn each scenario description may be linked with different screen recorded videos that were previously generated.

Accordingly, at 310, and in response to the automatic screen recorder program 160 determining, via the generative AI model, that a stored video (i.e. previously screen recorded video) and/or scenario description associated with the feature documentation matches the identified scenario in the received natural language query, the automatic screen recorder program 160 may retrieve and forward/send the screen recorded video previously generated, and/or a video link, to the user 202 (for instance, via the chatbot interface 204).

On the contrary, based on a determination that a video has not been generated for the particular/identified scenario, the automatic screen recorder program 160 may take further steps which include automatically generating a screen recorded video for the identified scenario. Specifically, and as depicted at 312 in FIG. 3, the automatic screen recorder program 160 may generate a feature file. More specifically, upon identifying the feature documentation and/or sources matching the features and the identified scenario from database and/or knowledgebase (via RAG) at 378, and based on determining that a video has not been generated for the identified scenario, the automatic screen recorder program 160 may use the generative AI model 212 (FIG. 2) to generate a feature file at 312 which may translate the feature documentation and/or matching sources into step-by-step instructions for performing a task based the identified scenario. Thus, accordingly, and as depicted at 378, the automatic screen recorder program 160 may use the feature documentation and/or matching sources from the database 214 (FIG. 2) and knowledgebase 224 (FIG. 2) to generate the feature file. As depicted at 314, in generating the feature file 220, the generative AI model 212 may also add any required prerequisite values to the feature file 220, whereby the prerequisite values may include values requiring entry into a user interface (UI), which in the previously provided example of the received natural language query includes adding an order type field and amount value field to the feature file. As previously described, FIG. 4 includes an example feature file generation process 400 based on a different scenario, whereby the feature file 402 is generated using Gherkin syntax. As further indicated in example feature file 402, for the scenario "Application Login", the automatic screen recorder program 160 may include in the feature file 402 step-by-step instructions for an application log-in which may further include adding prerequisite values such as "admin" and "xxx" that are required for entry into the UI fields "userid" and "password", respectively. Again, in the previously presented example (i.e. the example including the received natural language query: "As a Support Administrator, I want to know how to change the order type and amount for a given order"), the prerequisite values may include values requiring entry into the UI fields "order type" and "amount."

Next, based on the generated feature file at 314, the automatic screen recorder program 160 may generate code for executing the step-by-step instructions. Specifically, while the feature file may include the step-by-step instructions for performing the task from the identified scenario in the natural language query, the feature file does not include executable code instructions.

Accordingly, the automatic screen recorder program 160 may use the generative AI model 212 (FIG. 2) as well as the screen record layer 222 (FIG. 2) to generate executable code for performing the step-by-step instructions in the feature file. According to one embodiment, and as depicted at 316, the automatic screen recorder program 160 may use Xpath 226 (FIG. 2) to identify a location of computer/web elements on a web page, whereby the web element may be associated with a feature from the feature file that is required to execute an instruction from the step-by-step instructions. Furthermore, as previously described in FIG. 2 and now depicted at 318 and 388 in FIG. 3, the automatic screen recorder program 160 may further generate executable code based on the feature file by referencing existing code which may be stored on database 214 (FIG. 2) and/or knowledgebase 224 (FIG. 2). In turn, based on the Xpath, any further programming arguments, datatypes, and predetermined and/or user provided values, the automatic screen recorder program 160 may use the generative AI model 212 (FIG. 2), as well as the database 214 and knowledgebase 224 as previously described, to generate executable code for the step-by-step instructions as depicted at code generation 228.

Thereafter, at 320 in FIG. 3, the automatic screen recorder program 160 may execute the generated code. Specifically, and as previously described in FIG. 2, the automatic screen recorder program 160 may use one or more combinations of a web driver 232, user interface (UI) framework 234, and screen video recorder 236 to execute the generated code (at 320 in FIG. 3) while simultaneously recording the executed code to automatically generate the screen recorded video for the identified scenario.

More specifically, and as depicted at 322, the automatic screen recorder program 160 may invoke/use the web driver 232 (FIG. 2) to, for example, launch a computer/web application as well as navigate through the web application based on the step-by-step instructions and corresponding generated code. Furthermore, the automatic screen recorder program 160 may invoke/use a UI automation framework 234 (FIG. 2) for automatically and programmatically executing a feature flow based on the generated code that corresponds to the features and steps identified in the feature file.

In turn, at 324, the automatic screen recorder program 160 may use the web driver 232 and/or user interface (UI) framework 234 to organize the generated feature file, the generated code, and other dependencies (such as code libraries, constants), and automatically execute the generated code to execute the identified scenario, which may include performing computer screen interactions such as navigating through the web page and web elements according to the step-by-step instructions as well as recording the screen interactions. Specifically, the automatic screen recorder program 160 may use the screen video recorder 236 (FIG. 2) to automatically record the executed code and thereby create the screen recorded video for the identified scenario associated with the received natural language query.

Next, at 326, the automatic screen recorder program 160 may subsequently store the screen recorded video on database 214, whereby the storing may further include linking the natural language query, corresponding feature documentation, the text prompt, and the search vectors/terms with the screen recorded video. I Then, at 328, the automatic screen recorder program 160 may automatically share the generated and stored screen recorded video with the user 202. According to one embodiment, the automatic screen recorder program 160 may share a video link to the generated and stored screen recorded video.

It may be appreciated that FIGS. 2-5 provide only illustrations of one implementation and does not imply any limitations with regard to how different embodiments may be implemented. Many modifications to the depicted environments may be made based on design and implementation requirements.

As previously described, the present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Furthermore, machine learning as described herein may broadly refer to machine learning algorithms that may learn from data and provide output. More specifically, machine learning is a branch of artificial intelligence that relates to algorithms such as mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusters, such as k-means clusters, mean-shift clusters, and spectral clusters; (v) factorization machines, principal component analyzers and kernel principal component analyzers; and (vi) ensembles or other combinations of machine-learning models. Neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

What is claimed is:

1. A computer-implemented method for automatically generating a computer screen recorded video based on a natural language query, the computer-implemented method comprising:

based on receiving the natural language query:

identifying, using a generative artificial intelligence (AI) model, a scenario based on an understanding of the received natural language query, wherein the identified scenario further comprises a determined scenario description;

generating, using the generative artificial intelligence (AI) model, a feature file corresponding to the scenario identified by the generative AI model based on the received natural language query, wherein the generated feature file comprises step-by-step instructions and one or more computer elements required for performing the identified scenario based on feature documentation comprising one or more manuals and specifications;

based on the generated feature file, automatically generating, using the generative AI model, computer code corresponding to each of the step-by-step instructions from the generated feature file;

executing the generated computer code, wherein executing the generated code further comprises executing navigating and interacting with the one or more computer elements in a sequence according to the step-by-step instructions from the generated feature file;

automatically recording as a video, using a screen recorder, the execution of the generated computer code, and storing the recorded video, wherein storing the recorded video further comprises linking the recorded video with the feature documentation, the identified scenario, and the natural language query, wherein the feature documentation is further linked with different scenarios and corresponding scenario descriptions; and providing the recorded video as output in response to the received natural language query.

2. The computer-implemented method of claim 1, further comprising:

determining, using the generative AI model, that a previously recorded video stored on a database matches the identified scenario based on the received natural language query;

in response to determining that the previously recorded video matches the identified scenario, automatically retrieving and providing the previously recorded video as output in response to the natural language query.

3. The computer-implemented method of claim 1, wherein generating, using the generative AI model, the feature file corresponding to the scenario identified by the generative AI model further comprises:

converting terms from the natural language query to search terms;

using the search terms to identify the feature documentation associated with the search terms;

extracting information and instructions from the feature documentation, wherein extracting the information and instructions further comprises identifying the one or more computer elements required for performing the identified scenario;

generating the step-by-step instructions, using the generative AI model, based on the extracted information and instructions from the feature documentation.

4. The computer-implemented method of claim 3, wherein automatically generating, using the generative AI model, the computer code corresponding to each of the step-by-step instructions from the generated feature file further comprises:

generating, using the generative AI model, the computer code based on stored computer code matching the identified scenario and step-by-step instructions from the feature file.

5. The computer-implemented method of claim 1, wherein the generated computer code is executed using at least one of web driver and a user interface (UI) framework.

6. The computer-implemented method of claim 1, wherein providing the recorded video further comprises:

providing a link to the recorded video on a chat interface.

7. A computer system for automatically generating a computer screen recorded video based on a natural language query, comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing operational steps comprising:

based on receiving the natural language query:

identifying, using a generative artificial intelligence (AI) model, a scenario based on an understanding of the received natural language query, wherein the identified scenario further comprises a determined scenario description;

generating, using the generative artificial intelligence (AI) model, a feature file corresponding to the scenario identified by the generative AI model based on the received natural language query, wherein the generated feature file comprises step-by-step instructions and one or more computer elements required for performing the identified scenario based on feature documentation comprising one or more manuals and specifications;

based on the generated feature file, automatically generating, using the generative AI model, computer code corresponding to each of the step-by-step instructions from the generated feature file;

executing the generated computer code, wherein executing the generated code further comprises executing navigating and interacting with the one or more computer elements in a sequence according to the step-by-step instructions from the generated feature file;

automatically recording as a video, using a screen recorder, the execution of the generated computer code, and storing the recorded video, wherein storing the recorded video further comprises linking the recorded video with the feature documentation, the identified scenario, and the natural language query, wherein the feature documentation is further linked with different scenarios and corresponding scenario descriptions; and providing the recorded video as output in response to the received natural language query.

8. The computer system of claim 7, further comprising:

determining, using the generative AI model, that a previously recorded video stored on a database matches the identified scenario based on the received natural language query;

in response to determining that the previously recorded video matches the identified scenario, automatically retrieving and providing the previously recorded video as output in response to the natural language query.

9. The computer system of claim 8, wherein generating, using the generative AI model, the feature file corresponding to the scenario identified by the generative AI model further comprises:

converting terms from the natural language query to search terms;

using the search terms to identify the feature documentation associated with the search terms;

extracting information and instructions from the feature documentation, wherein extracting the information and instructions further comprises identifying the one or more computer elements required for performing the identified scenario;

generating the step-by-step instructions, using the generative AI model, based on the extracted information and instructions from the feature documentation.

10. The computer system of claim 9, wherein automatically generating, using the generative AI model, the computer code corresponding to each of the step-by-step instructions from the generated feature file further comprises:

generating, using the generative AI model, the computer code based on stored computer code matching the identified scenario and step-by-step instructions from the feature file.

11. The computer system of claim 7, wherein the generated computer code is executed using at least one of web driver and a user interface (UI) framework.

12. The computer system of claim 7, wherein providing the recorded video further comprises:

providing a link to the recorded video on a chat interface.

13. A computer program product for automatically generating a computer screen recorded video based on a natural language query, comprising:

one or more tangible computer-readable storage devices and program instructions stored on at least one of the one or more tangible computer-readable storage devices, the program instructions executable by a processor, the program instructions comprising:

based on receiving the natural language query:

identifying, using a generative artificial intelligence (AI) model, a scenario based on an understanding of the received natural language query, wherein the identified scenario further comprises a determined scenario description;

generating, using the generative artificial intelligence (AI) model, a feature file corresponding to the scenario identified by the generative AI model based on the received natural language query, wherein the generated feature file comprises step-by-step instructions and one or more computer elements required for performing the identified scenario based on feature documentation comprising one or more manuals and specifications;

based on the generated feature file, automatically generating, using the generative AI model, computer code corresponding to each of the step-by-step instructions from the generated feature file;

executing the generated computer code, wherein executing the generated code further comprises executing navigating and interacting with the one or more computer elements in a sequence according to the step-by-step instructions from the generated feature file;

automatically recording as a video, using a screen recorder, the execution of the generated computer code, and storing the recorded video, wherein storing the recorded video further comprises linking the recorded video with the feature documentation, the identified scenario, and the natural language query, wherein the feature documentation is further linked with different scenarios and corresponding scenario descriptions; and providing the recorded video as output in response to the received natural language query.

14. The computer program product of claim 13, further comprising:

determining, using the generative AI model, that a previously recorded video stored on a database matches the identified scenario based on the received natural language query;

in response to determining that the previously recorded video matches the identified scenario, automatically retrieving and providing the previously recorded video as output in response to the natural language query.

15. The computer program product of claim 14, wherein generating, using the generative AI model, the feature file corresponding to the scenario identified by the generative AI model further comprises:

converting terms from the natural language query to search terms;

using the search terms to identify the feature documentation associated with the search terms;

extracting information and instructions from the feature documentation, wherein extracting the information and instructions further comprises identifying the one or more computer elements required for performing the identified scenario;

generating the step-by-step instructions, using the generative AI model, based on the extracted information and instructions from the feature documentation.

16. The computer program product of claim 13, wherein automatically generating, using the generative AI model, the computer code corresponding to each of the step-by-step instructions from the generated feature file further comprises:

generating, using the generative AI model, the computer code based on stored computer code matching the identified scenario and step-by-step instructions from the feature file.

17. The computer program product of claim 13, wherein providing the recorded video further comprises:

providing a link to the recorded video on a chat interface.

* * * * *